M. RATIGNIER & H. PERVILHAC.
METHOD OF PRODUCING AN UNDULATED OR LOOSENED SURFACE UPON FABRICS.
APPLICATION FILED JULY 7, 1911.
1,012,914.
Patented Dec. 26, 1911.
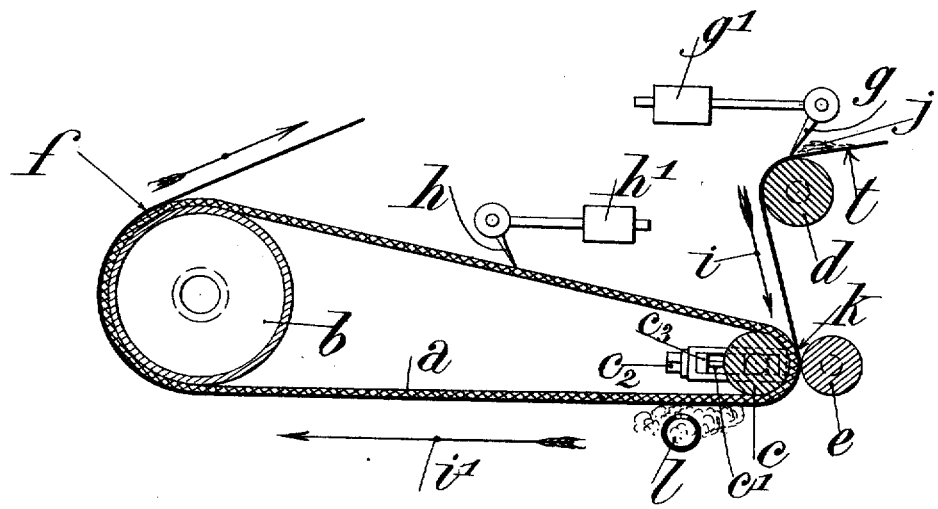
WITNESSES:
John C. Anders
Arthur S. Pettit
INVENTORS:
Marius Ratignier
Henry Pervilhac
BY
ATTY

UNITED STATES PATENT OFFICE.

MARIUS RATIGNIER, OF LYON, AND HENRY PERVILHAC, OF VILLEURBANNE, FRANCE.

METHOD OF PRODUCING AN UNDULATED OR LOOSENED SURFACE UPON FABRICS.

1,012,914. Specification of Letters Patent. Patented Dec. 26, 1911.

Application filed July 7, 1911. Serial No. 637,287.

*To all whom it may concern:*

Be it known that we, MARIUS RATIGNIER and HENRY PERVILHAC, citizens of the French Republic, residing, respectively, at Lyon and Villeurbanne, Rhone, both in France, have invented a certain new and useful Improvement in Methods of Producing an Undulated or Loosened Surface Upon Fabrics, of which the following is a specification.

The object of the invention is to give the right side or face of plain or figured fabric an undulated or loosened surface so as to procure a fluffy appearance. This effect is produced by slightly loosening or distending the loops constituted by the warp threads of the fabric without apparent deformation of the back of the fabric. This result is obtained by causing the fabric to adhere to the surface of a sheet of rubber or other elastic material in a stretched condition; by the return of this sheet to its normal state it draws the fabric in its contraction and produces the effect sought for.

The annexed drawing illustrates in section an apparatus for carrying out the method in a continuous manner, the essential part of the apparatus is an endless table or conveyer $a$ made of rubber or other stretchable material of a thickness of about a centimeter, one end of the conveyer passes over a hollow cylinder $b$ capable of being interiorly cooled and the other end passes over a roller $c$ of smaller diameter provided with tensioning means such as adjustable bearing blocks $c^1$ adjustable by nuts $c^2$ in guides $c^3$.

The fabric $t$ supplied from a roller or other support, not shown, the wrong side turned upward passes firstly over a roller $d$ situated above the roller $c$ and then passes downward in the direction of the arrow $i$ and is engaged between the rubber table and a pressure roller $e$; it then follows the lower surface of the table in the direction of the arrow $i^1$ and is detached therefrom at $f$ after having turned upon the cylinder $b$ over about half the circumference of said cylinder. At the upper part of the roller $d$ a scraper $g$ is arranged bearing on the back of the fabric by means of counterweights $g^1$ or springs. An adhesive substance $j$ is fed behind the scraper which spreads upon the back of the fabric in the form of a thin layer, the excess being retained by the scraper $g$. The fabric thus coated is applied by the action of roller $e$ onto the surface of the rubber table at $k$ and adheres thereto and is carried around to the point $f$. At the point where the fabric is brought into contact and adheres to the outer surface of the table by reason of the pronounced curvature of said table at this point and the thickness of the rubber it is considerably more stretched at its outer than at its inner surface and this stretching has the effect of loosening or distending the loops of the warp threads. The equilibrium is reëstablished directly the table resumes its movement in a straight line, when the outer surface of the rubber is contracted to its normal state during which contraction it shrinks the fabric adhering to it, and this shrinking has the effect of giving the fabric the fluffy appearance sought for. The fabric is fixed in this form by vapor supplied by a perforated pipe, or the like $l$ then dried and subsequently cooled on the cylinder $b$ which is traversed by a current of water or cold air. The fabric is finally separated from the table at $f$. The table is then cleaned by a scraper $h$ under the action of counterweight $h^1$ before returning into contact with the fabric.

The details of the described apparatus can vary according to the nature of the fabrics to be treated and the degree of effect desired.

What we claim as our invention and desire to secure by Letters Patent of the United States is:—

1. Method of producing an undulated or loosened surface upon a fabric consisting in stretching a sheet of extensible material applying the fabric thereto by means of an adhesive, contracting said sheet so as to shrink the fabric adhering thereto, fixing the fabric in the shrunk condition, and finally removing said fabric from said sheet.

2. Method of producing an undulated or loosened surface upon a fabric consisting in stretching a sheet of extensible material applying the fabric thereto by means of an adhesive, contracting said sheet so as to shrink the fabric adhering thereto, fixing the fabric in the shrunk condition, drying the fabric, and finally removing said fabric from said sheet.

3. Method of producing an undulated or loosened surface upon a woven fabric consisting in applying an adhesive to the fabric, stretching the outer face of a sheet of extensible material by passing same over a roller, causing the fabric to adhere to said stretched outer surface of said sheet by means of said adhesive contracting said sheet and said fabric by drawing said sheet off said roller, fixing the fabric in the shrunk condition, and finally removing it from said sheet.

4. Method of producing an undulated or loosened surface upon a woven fabric consisting in applying an adhesive to the fabric, removing the excess of adhesive therefrom, pressing said fabric onto the outer surface of an endless sheet of extensible material traveling over two rollers, one of which is of small diameter, at a point where said sheet passes over said smaller roller so as to cause said sheet to adhere thereto, contracting said sheet and said fabric by drawing said sheet off said smaller roller, fixing said fabric after it leaves said roller supported upon the sheet, drying said fabric, removing said fabric from the sheet and finally cleansing the sheet from adhesive.

In witness whereof we have signed this specification in the presence of two witnesses.

MARIUS RATIGNIER.
HENRY PERVILHAC.

Witnesses:
GASTON JEANNIAUX,
MARIN VACHON.

Copies of this patent may be obtained for five cents each, by addressing the "Commissioner of Patents, Washington, D. C."